United States Patent [19]
Alburn

[11] 3,867,537
[45] Feb. 18, 1975

[54] METHOD OF TREATING NEISSERIA INFECTIONS WITH 6-[2-(3-AMIDINOUREIDO)-2-PHENYL ACETAMIDO]PENICILLANIC ACID

[75] Inventor: Harvey E. Alburn, West Chester, Pa.

[73] Assignee: American Home Products Corporation, New York, N.Y.

[22] Filed: Sept. 28, 1971

[21] Appl. No.: 184,590

Related U.S. Application Data

[63] Continuation-in-part of Ser. No. 171,367, Aug. 12, 1971, Pat. No. 3,741,960.

[52] U.S. Cl. .............................................. 424/271
[51] Int. Cl............................................ A61k 21/00
[58] Field of Search ................................... 424/271

[56] References Cited
UNITED STATES PATENTS
3,579,501   5/1971   McGregor........................... 424/271

OTHER PUBLICATIONS
Price et al., Antimicrobial Agents and Chemotherapy 1970, pages 17–29 (June 1971).
The Merck Manual of Diagnosis and Therapy, 11th Edition, Merck and Co., Inc., 1966, pages 1455–1458.

Primary Examiner—Jerome D. Goldberg
Attorney, Agent, or Firm—Stephen Venetianer; Vito Victor Bellino

[57] ABSTRACT

A method for treating infections caused by the Neisseria genus is described using an effective amount of 6-[2-(3-amidino-ureido)-2-phenyl acetamido]penicillanic acid.

1 Claim, No Drawings

METHOD OF TREATING NEISSERIA INFECTIONS WITH 6-[2-(3-AMIDINOUREIDO)-2-PHENYL ACETAMIDO]PENICILLANIC ACID

This application is a continuation-in-part of copending application Ser. No. 171,367 filed Aug. 12, 1971, now U.S. Pat. No. 3,741,960 in the name of Alburn and Dvonch, and titled "Amidinoureido Cycloaliphatic Penicillins."

This invention relates to the treatment of Neisseria infections with 6-[2-(3-amidinoureido)-2-phenyl acetamido]penicillanic acid.

The present invention provides for an effective treatment of Neisseria infections in a host with a semi-synthetic penicillin which to date has shown effectiveness of substantially the same magnitude as ampicillin and penicillin G, the most widely used therapeutic agents in the treatment of *Neisseria gonorrhoeae*.

The penicillin useful in the method of the present invention has the structural formula

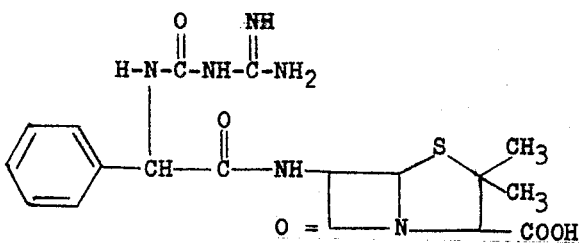

As will be understood by those skilled in the art, the foregoing compound may be utilized in its acid form or in the form of the therapeutically-active salts thereof, e.g., the sodium or potassium salts, or hydrochloride, sulfate, fumarate, etc., or in the form of the pharmaceutically acceptable non-toxic salts prepared by the reaction of the penicillin compound with an amine or diamine base, e.g., procaine or various N-N'disubstituted alkylene diamines, such as N,N'-dibenzylethylene-diamine, etc.

The α-carbon atom of the penicillin side chain (to which the amidinoureido group is attached) of the compound of formula I is an asymmetric carbon atom and the substituent acids can therefore exist in two optically active isomeric forms [the D- and L-enantiomers], as well as the DL form which is a mixture of the two optically active forms; all such isomers are included with the compound defined by formula I preferred isomer being the D form. The compound of formula I is described in U.S. Pat. No. 3,579,501, the disclosure of which is incorporated herein by reference. This compound is generally recovered in the form of its hydrate (i.e., mono, di, or trihydrate). If desired, it may be converted to the anhydrous form by procedures known in the art such as described in U.S. Pat. No. 3,144,445. Therefore, reference to the compound of formula I is intended to embrace both the anhydrous and hydrated forms.

6-[2-(3-amidinoureido)-2-phenyl acetamido]penicillanic acid has been found particularly effective against penicillinresistant strains and penicillin-sensitive strains of *Neisseria gonorrhoeae*. The effectiveness of this compound was compared with that of ampicillin and penicillin G.

The sensitivities of the penicillin-resistant strains of Neisseria gonorrhoeae were determined by an agar dilution method in general accordance with a standardized procedure recommended by the Public Health Service and published in PHS publication No. 499, (revised 1969). The mean sensitivity of the penicillins tested is reported on an active moiety basis in the following table:

Table I

| Penicillin | Mean Sensitivity of 23 strains of *Neisseria gonorrhoeae* to Various Penicillins Minimal Inhibitory Concentration ($\mu$g./ml.) | |
|---|---|---|
| | Penicillin-sensitive (11 strains) | Penicillin-resistant (12 strains) |
| Penicillin G | 0.0320 | 0.329 |
| Ampicillin | 0.0835 | 0.224 |
| 6-[D-2-(3-amidino-ureido)-2-phenyl-acetamido]penicillanic acid, monohydrate | 0.0465 | 0.275 |

The compound of formula I has also been found effective against other Neisseria species such as Neisseria catarrhalis giving an MIC value of 0.244 μg./ml. against *Neisseria catarrhalis* 8193.

In the treatment of Neisseria infections in human beings the compound of formula I is administered parenterally, or orally, preferably parenterally. The dose to be administered is a variable of numerous factors including the severity of the condition being treated, size and age of the patient, whether the patient is available for maintenance dose treatment and the particular characteristics of the individual patient. Generally the compound is administered in an amount from about 1 mg. to 75 mg. per kg./day and preferably in the range of 5 mg. to 30 mg./kg./day in a single dose. Formulation of suitable injectionable compositions may be made in the same manner as other penicillins including injectable forms of ampicillin. Examples of typical formulations are found in U.S. Pat. Nos. 2,745,785 and 3,744,145.

The penicillin of formula I may be used in combination with other therapeutic agents in a manner that will be obvious to those skilled in the art. For example, in the treatment of *Neisseria gonorrhoeae*, this compound can be administered in conjunction with Probenecid (di-propylsulfamyl benzoic acid).

What is claimed is:

1. A method of treating Neisseria infection caused by a penicillin-resistant strain of *Neisseria Gonorrhoeae* in a human host afflicted with said infection which comprises administering to said human host an effective amount for treating said infection of 6-[D-2-(3-amidinoureido)-2-phenyl acetamido] penicillanic acid.

* * * * *